SYNCHRONIZING SYSTEM

Filed April 21, 1948 3 Sheets-Sheet 1

INVENTOR
William D. Houghton
BY Olin J. Mitchell
ATTORNEY

INVENTOR
William D. Houghton
BY
ATTORNEY

Feb. 6, 1951 W. D. HOUGHTON 2,540,167

SYNCHRONIZING SYSTEM

Filed April 21, 1948 3 Sheets-Sheet 3

INVENTOR
William D. Houghton
BY
Olin J. Mitchell
ATTORNEY

Patented Feb. 6, 1951 2,540,167

UNITED STATES PATENT OFFICE 2,540,167

SYNCHRONIZING SYSTEM

William D. Houghton, Port Jefferson, N. Y., assignor to Radio Corporation of America, a corporation of Delaware Application April 21, 1948, Serial No. 22,431

13 Claims. (Cl. 250—36)

Figure 2:
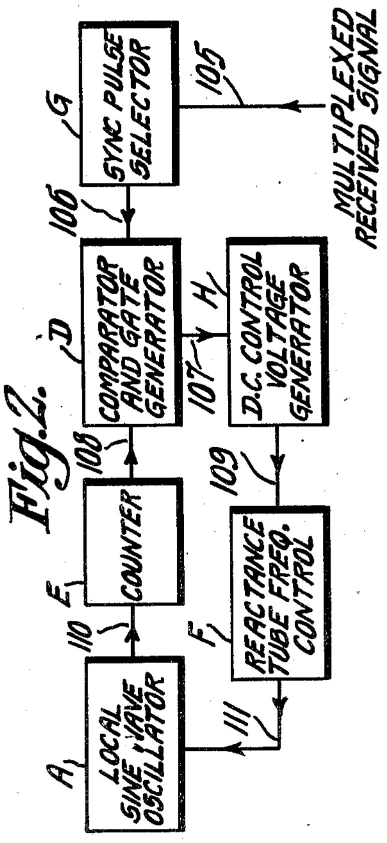

This invention relates to electrical synchronization, and more particularly to synchronization methods and arrangements for time division multiplex and television.

In time division multiplex systems, as well as in television, the quality of the received signal is a direct function of the exactness of the synchronizing between the distant transmitter and the local receiver.

Heretofore it has been popular to use a regenerative feedback pulse type oscillator in the receiver. The oscillator is held in step by means of the received synchronizing pulse. This type of circuit has a number of disadvantages, the most serious being the mis-synchronization due to noise. That is, the received synchronizing pulse is used to trip the local pulse oscillator which has a free-running frequency slightly lower than the frequency of the received synchronizing pulse. It is, therefore, impossible for the oscillator to distinguish between a pulse of noise and the synchronizing pulse and may readily be tripped prematurely by the noise pulses. This false tripping results in audible noise in a time division mutiplex system and in a ragged line picture in television reproduction.

There has been proposed a synchronizing pulse gating system which normally opens a gate at a time just preceding the arrival of the synchronizing pulses, thus the mis-synchronization due to noise would be limited to a relatively short time period. When this circuit was used on time division systems, considerable reduction in noise due to mis-synchronizing was observed. The noise due to mis-synchronizing was, however, not completely eliminated, but for simple systems using relatively few channels, it was reduced to within satisfactory limits.

The noise problem was also recognized in television and as a result, the so-called time averaging synchronizing system was proposed. This system consists of a highly stabilized Hartley oscillator, the frequency of which is controlled by a reactance tube. The synchronizing pulses are compared with the sine wave from the oscillator and a variable D.-C. voltage is derived. This D.-C. voltage is filtered to remove the noise frequency components and is then applied to the reactance tube to correct the frequency of the Hartley oscillator.

There are two requirements which must be met in a perfect synchronizing system. One is the complete elimination of noise and the other is the elimination of drift or time lag as the receiver tries to follow the changes in phase of the transmitted synchronizing pulses.

In television, the elimination of noise in the synchronizing circuits results in a much sharper picture where loss in detail is due purely to noise resulting from holes and bright spots superimposed on the picture. Elimination of drift allows the picture to remain stationary on the screen of the kinescope tube. In television, however, a slight long-time drift of, say, up to several microseconds is acceptable, although not entirely desirable.

In time division systems, noise in the synchronizing circuits results in noise in all channels simultaneously and may add as much as 6 db. to the noise which would be present in a system involving perfect synchronizing. However, noise components with a frequency below the cut-off of the audio system do not appear as noise in the output. In time division systems, drifts of several microseconds would be intolerable, since this would appear as changes in audio levels. When cross talk balancing methods are employed, the timing between the transmitted signal and the received signal must be kept within one-tenth of a microsecond in a 30 channel system to maintain the cross talk within the desired limits. Cross talk is the signal remaining in one channel due to modulation applied to the preceding channel, and cross talk balancing is the injection of energy into the succeeding channel of the correct amplitude and phase to reduce the cross talk to within specified limits.

The circuit used in present television receivers of the more expensive type is not practical for time division systems, since the position of the synchronizing pulses on the side of a sine wave is used to obtain the D.-C. correcting voltage, and considerable change in phase (from a time division standpoint) is required in order to obtain the desired correcting voltage. Of course, a high gain D.-C. amplifier may be employed, but this further increases the sensitivity of the circuit to line voltage and component variations.

According to this invention, a combination of gating, sync pulse limiting and time averaging is employed to give a circuit which has a bright future, as far as time division multiplex equipment is concerned.

A primary object of this invention is to improve electrical synchronization.

Another object of this invention is to improve synchronization in time division multiplex and television equipment.

Another object of this invention is to improve signal trannmission quality of communication and television circuits.

Figure 1:
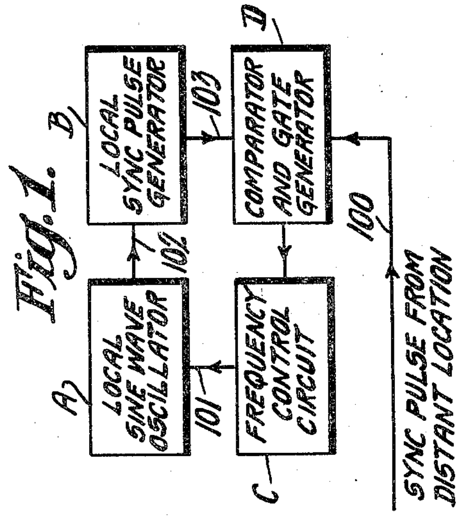
Figure 3:
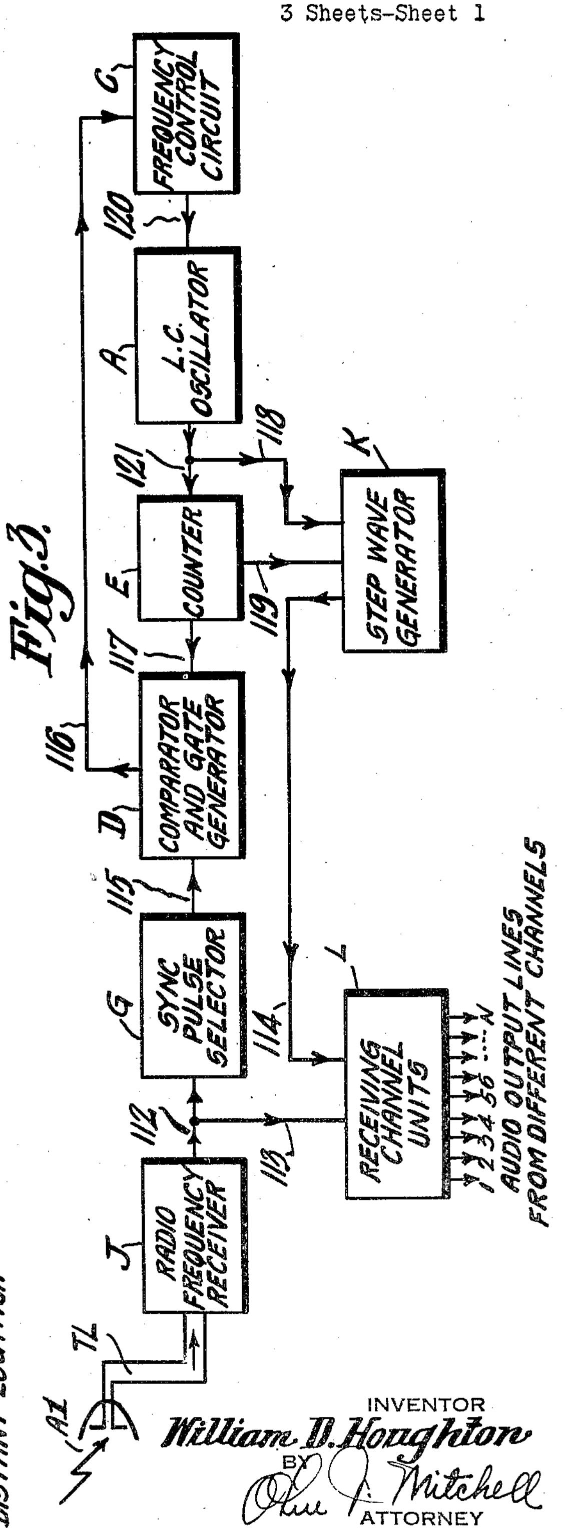
Figures 4, 5:
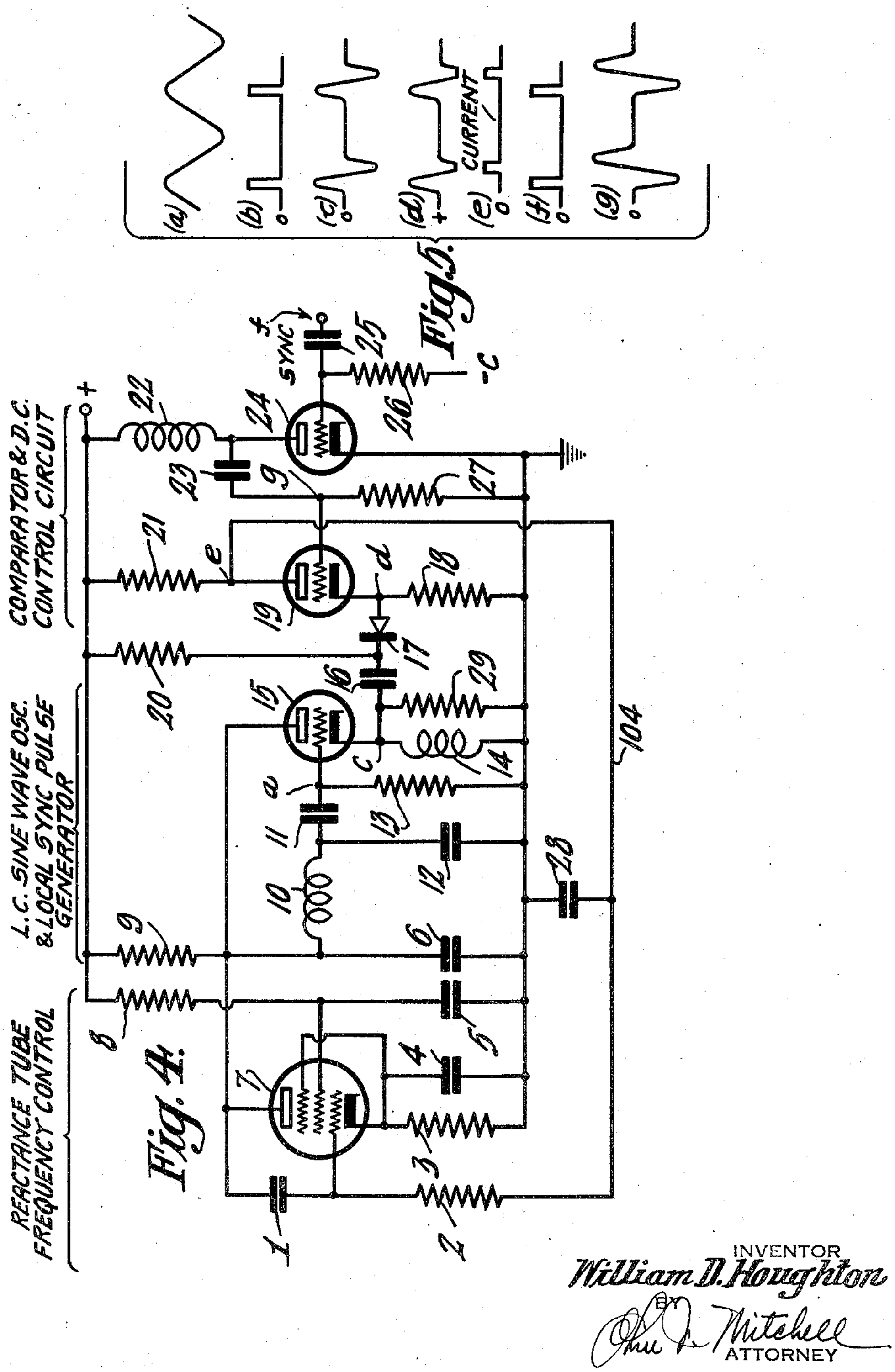
Figures 6, 7:
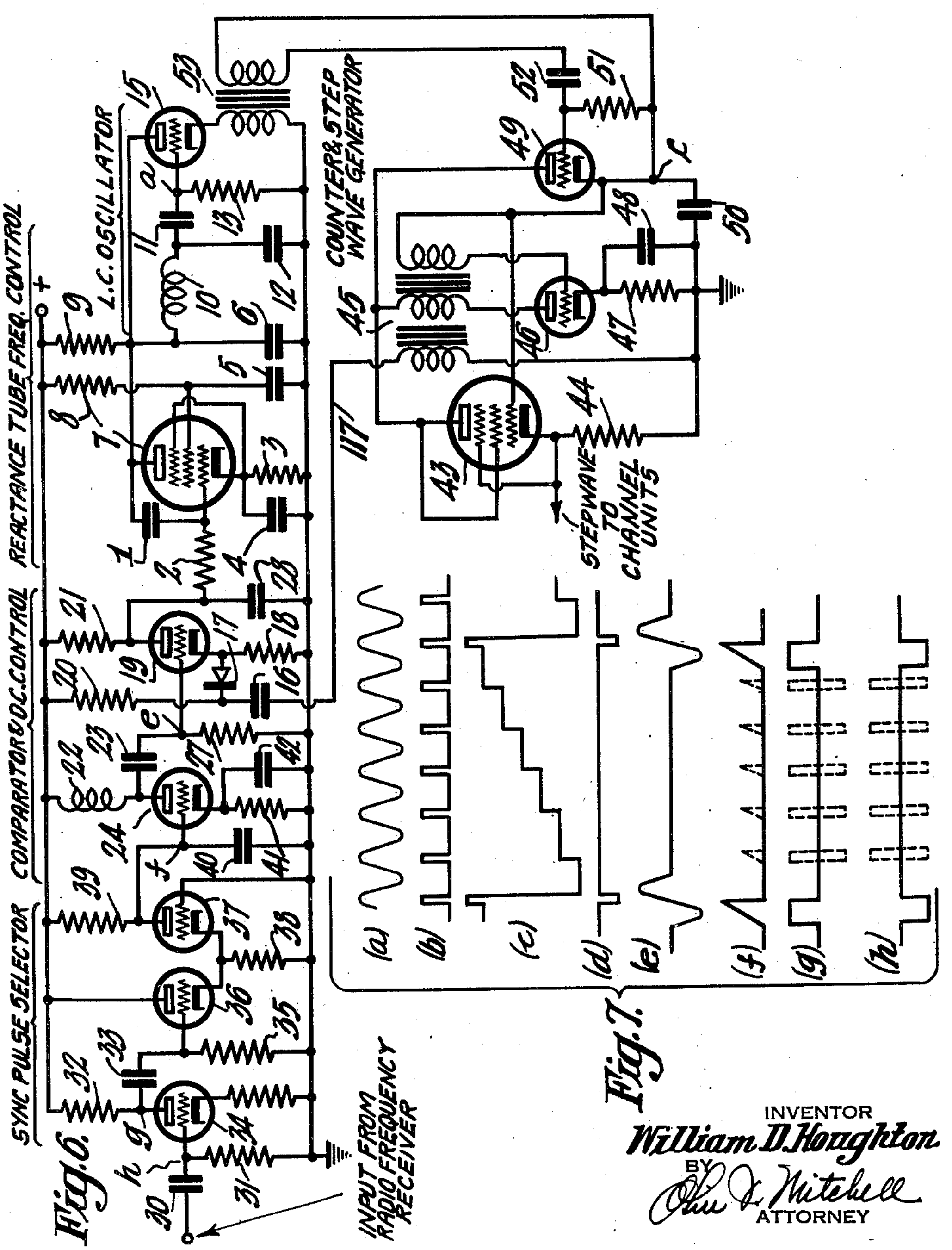

Other and incidental objects of the invention will be apparent to those skilled in the art from a reading of the following specification and an inspection of the accompanying drawing in which:

Figures 1, 2 and 3 indicate by block diagram several forms of this invention;

Figure 4 indicates by circuit diagram suitable arrangements for the practice of this invention;

Figures 5a to 5g, inclusive, indicate graphically the operation of one form of this invention;

Figure 6 shows by circuit diagram another form of this invention; and

Figures 7a through 7h graphically illustrate the operation of this invention in one of its forms.

In Figure 1, there is shown a basic block diagram of the main components of the system. A sine wave oscillator A is used to drive a local sync pulse generator B via lead 102, which in turn is used to drive a gate generator and comparator D via lead 103. The selected synchronizing pulse is also connected to D via lead 100. The output from comparator and gate generator D, which is a variable D.-C. voltage, the amplitude of which is a function of the relative phase of the locally generated pulse and the received synchronizing pulse, is used to operate the frequency controlling circuit C in a manner such as to maintain the desired phase relation between the locally generated synchronizing pulse and the received sync pulses.

Figure 2 shows in block diagram the manner in which this circuit is applied to a time division system. As in Figure 1, A is the local sine wave oscillator and in this case it is used to drive a counter circuit E via lead 110 which divides the frequency down to that of the received synchronizing pulses. The pulse from the counter is coupled to a gate generator and comparator D via lead 108. The comparator D is similar to D in Figure 1. The multiplexed signal from a radio frequency receiver is coupled to a synchronizing pulse selector G via lead 105. The synchronizing pulse selector removes the synchronizing pulse and couples it to comparator D via lead 106. The output from D is coupled to a D.-C. voltage generator H via lead 107, and the D.-C. controlling voltage from H is coupled to a reactance tube frequency controlled circuit F via lead 109. The output from F is coupled to the sine wave oscillator A via lead 111.

In Figure 3 is shown in block form a complete receiving terminal of a time division system utilizing the circuits of this invention. The radio frequency waves are picked up on antenna A—1 and coupled to radio frequency receiver J via transmissoin line TL. Receiver J demodulates the radio frequency wave and re-establishes the complex pulse type signal which is coupled to a sync pulse selector G and receiving channel units L via leads 112 and 113 respectively. The sync pulse selector G removes the synchronizing pulse and couples it via lead 115 to the gate generator and comparator D. The output from the LC oscillator A is coupled to a counter E and step wave generator K via lead 121 and 118 respectively. The step voltage wave output from K is coupled to the receiving channel units L and causes them to become operative sequentially and at a time when the pulse assigned to the channel is present on line 113. A pulse on lead 119 from counter E causes the discharge of the step wave generator K. A pulse from counter E is also coupled to the gate generator section of D via lead 117. The varying D.-C. output voltage is coupled via lead 116 to the frequency control circuit C, which in turn controls the frequency of A via information carried over line 120.

Figure 4 shows in schematic form a circuit diagram of the invention, and Figures 5a to 5g show a series of curves explaining the operation of Figure 4. The operation of the circuit of Figure 4 is as follows.

The Colpitts type sine wave oscillator consists of vacuum tube 15, coil 10, resistors 9 and 13, and condensers 6, 12 and 11. The condensers 6 and 12 form the capacitance divider across 10 to provide the proper feedback relation for stable operation. The sine wave as developed on the grid of tube 15 is shown in Figure 5a. On each positive peak of the sine wave on the grid of tube 15, current flows therein as indicated by the wave form Figure 5b. This current results in a voltage pulse, as shown in Figure 5c, being developed across coil 14. Resistor 29 is a dampening resistor which critically damps coil 14. That is, when tube 15 carries current, the increasing current in coil 14 develops a positive voltage thereacross, and when tube 15 cuts off, the field developed in coil 14 collapses and the result is a positive and negative pulse, as shown in Figure 5c, which is developed across resistor 29 and coupled to the anode of diode 17 via coupling condenser 16. Tube 19 is normally cut off due to a voltage developed across resistor 18 which results from current flowing through resistor 20, diode 17 and resistor 18 to ground. On the positive portion of the pulse across coil 14, condenser 16 is charged up by electron current from diode 17 and on the negative portion of the signal, the electron charge stored in condenser 16 is caused to flow through resistor 20, developing a voltage thereacross sufficient to lower the anode potential of diode 17 to a value lower than its cathode. This action renders diode 17 non-conducting and thus removes the bias developed across resistor 18, thereby allowing tube 19 to conduct. The voltage developed across resistor 18 is indicated by Figure 5d and the current in tube 19 is indicated by wave form Figure 5e.

The synchronizing pulse as shown in Figure 5f is coupled to the grid of normally non-conducting vacuum tube 24 via coupling condenser 25. Tube 24 is normally non-conducting due to bias voltage —c being applied to one end of leak 26. The result is a pulse of current which is caused to flow in the anode circuit of tube 24, resulting in a wave as indicated by wave form 5g being developed across resistor 27. That is, when coil 22 conducts, the current flows through coil 22, resulting in a negative pulse, and when current ceases in tube 24, the field built up in coil 22 collapses, resulting in a positive peak as shown. Resistor 27 forms the damping resistor for coil 22, and condenser 23 is a coupling condenser which couples the wave developed across coil 22 to the grid of tube 19 and grid leak 27. Thus, when tube 19 is allowed to conduct due to the negative portion of the wave form as shown in 5d causing diode 17 to cease conducting the amount of current carried by tube 19 is a function of the voltage on its grid. Condenser 28 is a bypass condenser which removes A.-C. components from lead 104. The D.-C. voltage thus developed at the anode of tube 19 is coupled to one end of resistor 2 in the grid of reactance tube 7. Tube 7 is a conventional reactance type tube with condenser 1 and resistor 2 supplying the proper phase relation between the anode and grid voltage. Resistor 8 is the screen dropping resistor and condenser 5 is the screen bypass condenser. This tube acts as a shunting reactance with a magnitude depending upon the amplification of the tube and hence upon the bias voltage developed by tube 19.

The operation of the circuit is as follows. With no synchronizing pulse present, the voltage on the grid of tube 19 is zero every time tube 19 is allowed to become operative. Hence, a particular value of anode voltage is developed and coupled to the grid of tube 7 via lead 104. Tube 7 is biased by means of resistor 3 and condenser 4 in such a manner that there is the desired negative bias on the grid of tube 7 and the oscillator frequency is adjusted to a value approximately equal to that of the received synchronizing pulses. When the pulses are applied to the grid of tube 24, the wave form as shown in Figure 5*g* is developed on the grid of tube 19. As the phase of the incoming synchronizing pulse varies with respect to the gate pulse developed across resistor 18, tube 19 will carry more or less current depending upon whether the gate occurs on the positive or negative portion of the wave as shown in Figure 5*g*.

In normal operation the frequency of the sine wave oscillator is adjusted in a manner such that the gate will fall mid-way between the negative and positive peaks of the wave in Figure 5*g*, and as the phase of Figure 5*g* tries to vary with respect to the gate, the voltage developed at the anode of tube 19 varies in such a manner as to apply the correcting voltage to the grid of the reactance tube 7 which in turn corrects the phase of the sine wave oscillator. It will readily be seen that, by increasing the slope of the curve in Figure 5*g*, any degree of phase correction may be had.

Figure 6 shows in schematic form the timing equipment for a time division multiplex system using this invention. Tube 34 together with resistors 31 and 32 and condensers 30 and 33 form an amplifier which amplifies the incoming complex wave as shown in Figure 7*h*. The dotted pulses indicate the modulated channel pulses and the solid line pulses indicate the synchronizing pulses. The amplified and inverted signal developed across resistor 32 is shown in Figure 7*g*. Tubes 36 and 37 form the sync pulse selector circuit and operate as follows.

Each positive pulse on the grid of tube 36 causes tube 36 to carry increased current and develop a voltage across resistor 38 sufficient to cause tube 37 to become non-conducting. When tube 37 becomes non-conducting, condenser 40 starts to charge linearly through resistor 39. Since tube 37 is cut off for a longer time when the synchronizing pulse is present on the input, condenser 40 charges to a higher value. The voltage developed across condenser 40 is as shown in Figure 7*f*. Tube 24 is normally biased by means of resistors 41 and condenser 42 to become conducting at the peaks of the higher sawtooth wave developed by the synchronizing pulses, and hence is unresponsive to the smaller dotted sawtooth shape pulses representing the modulated channel pulses. Tube 24 operates in a manner similar to that described for tube 24 in Figure 4. That is, a positive and negative pulse as shown in Figure 7*e* developed across coil 22 and resistor 27 forms the damping resistor for this coil. That is, positive and negative pulses as shown in Figure 7*e* are coupled to the grid of tube 19. The tube 15 together with coil 10 and condensers 6, 11 and 12 and resistors 9 and 13 form the sine wave oscillator as shown in Figure 7*a*. On each positive portion of the sine wave on the grid of tube 15, current flows through one winding of transformer 53, developing pulses of voltage across resistor 51 sufficient to cause normally non-conducting tube 49 to become operative. Tube 49 is normally non-conducting due to grid lead bias developed across resistor 51. That is, on each positive peak of the pulse applied to the grid of tube 49, a charge is stored in condenser 52. When the applied pulse across transformer 53 ceases, this charge leaks off through resistor 51, developing the cut-off bias voltage. Each time tube 49 conducts, an incremental charge is stored in condenser 50. The result is a wave consisting of a number of steps, as shown in Figure 7*c*, developed across condenser 50. Tube 46 is normally non-conducting due to a bias voltage developed across resistor 47 in its cathode. Condenser 48 maintains this bias voltage during the interval when tube 47 is non-conducting. That is, each time tube 46 conducts, current flows into condenser 48, and during the cut-off time the charge in condenser 48 leaks off through resistor 47, developing the desired voltage thereacross. When the step wave voltage across condenser 50 exceeds the bias potential on tube 46, tube 46 starts to conduct, and due to the connections of the windings on transformer 45, an increasing current causes an increasing voltage to be developed across the grid of tube 46. This action continues until tube 46 draws grid current and thus discharges condenser 50, at which time tube 46 ceases to conduct and remains non-conducting until the voltage across condenser 50 again exceeds the bias potential on tube 46. Each time tube 46 conducts, a negative pulse is applied to the anode of diode 17 via lead 117 and condenser 16. This negative pulse causes diode 17 to become non-conducting and thus allows tube 19 to conduct. Tube 19 operates in a manner described for tube 19 in Figure 4, and the voltage developed across resistor 21 is coupled to the grid resistor 2 of reactance tube 7, the operation of which was also described in Figure 4. Tube 43 is a cathode output amplifier which is used to couple the step voltage wave developed across condenser 50 to a bank of channel units.

The circuit of this invention has been used successfully under the rigid requirements of the 30 channel time division system.

Each time the local oscillator tube 15 produces a pulse, a damped oscillation as shown in Figure 5*c* is developed across coil 14 and applied to the anode of diode 17. Current is normally flowing through resistor 20, diode 17 and resistor 18, resulting in a bias being developed across resistor 18 sufficient to maintain tube 19 inoperative. When the damped oscillation as shown in Figure 5*c* is developed across coil 14, diode 17 is made to cease conducting on the negative portion of the oscillation in the following manner. On the positive peak of the oscillation across coil 14, electron current flows into condenser 16 through diode 17. On the negative portion of the signal, the electron current stored in condenser 16 is forced to flow through resistor 20, resulting in a voltage being developed thereacross sufficient to lower the anode potential of diode 17 to a value lower than its cathode. The result is that diode 17 is caused to cut off or become inoperative and hence the bias developed across resistor 18 is removed. This then allows tube 19 to become conducting and operate as an amplifier with resistor 18 as a cathode degeneration resistor for the period of time when diode 17 is rendered non-conducting. Thus, tube 19 is gated; that is, tube 19 is turned on for a short period of time and the current flow therein is a function of the amplitude of the voltage applied to its grid.

The applied synchronizing pulses as shown in Figure 5*f* are applied to the sync input and to the grid of tube 24 through condenser 25. Each synchronizing pulse causes a damped oscillation as shown in Figure 5g to occur across coil 22, the frequency of this oscillation being greater than the frequency of the applied synchronizing pulses. This electrical oscillation developed across coil 22 and shown in Figure 5g is coupled to the grid of gated tube 19 and hence determines the amplitude of current flow therein when it is gated on by the pulse developed across coil 14. For example, if the positive portion of Figure 5g were always present on the grid of tube 19 when it was allowed to conduct, the anode current would be a series of relatively high amplitude peaks resulting in the D.-C. voltage at the anode of tube 19 being relatively low in amplitude. The A.-C. components of the anode current are by-passed by condenser 28. If the phase of the gate and the electrical oscillation on the grid of tube 19 are so adjusted that each time diode 17 is caused to cut off, the negative portion of 5g is present on the grid of tube 19, tube 19 would not carry current at any time and the result would be the anode voltage would rise to a value equal to +B. This assumes, of course, that the negative portion of 5g is sufficient to cause tube 19 to be driven below cut-off. Thus, it will now be seen that the anode voltage of tube 19 may be made to vary between a relatively low voltage value and +B, depending upon the phase relation between the locally generated gate and the synchronizing pulse. This varying D.-C. is then used to drive reactance tube 7, which in turn controls the frequency of the local oscillator 15 and hence the frequency of the gate pulse. In normal operation, the frequency of the local oscillator is maintained equal to that of the applied synchronizing pulses and the phase position is maintained in a manner such that the gate (the time tube 19 is made operative) falls mid-way between the positive and negative peaks of the oscillations shown in 5g (developed across coil 22 and applied to the grid of tube 19).

It will be seen that any gradual changes in phase will cause tube 19 to carry more or less current and result in a greater or lesser D.-C. potential being applied to the grid of tube 7. This changing D.-C. potential causes tube 7 to maintain the frequency and hence the phase of the sine wave oscillation in the desired relationship with the synchronizing pulse. Tube 15 is the oscillator tube and coil 10 and condensers 6 and 12 form the oscillatory circuits. A D.-C. bias is developed across cathode resistor 3 in the cathode of tube 7 in order to obtain the desired operating voltages.

By increasing the slope of the rising voltage as shown in Figure 7e and also increasing the magnitude, a small change in phase results in a large voltage change across resistor 21 and hence a large change in correcting voltage being applied to reactance tube 7 of Figure 6. Since tube 19 is allowed to conduct only for a short period of time when this circuit is in step, this gate action eliminates the effects of noise which may occur during the time interval between successive synchronizing pulses and hence gives the added advantage of a gated synchronizing system.

Having thus described the invention, what is claimed is:

1. A signal generator synchronizing system comprising in combination an oscillatory circuit for producing an electrical oscillation recurring at a synchronous frequency and having a frequency of oscillation higher than said synchronous frequency, said electrical oscillation being sufficiently damped to be substantially completed before the start of the next oscillation, a tube, said tube having an input circuit, a frequency control output circuit and a gating circuit, said tube input circuit connected to receive said electrical oscillation, and a gating pulse generator arranged to receive timing energy from said signal generator, said gating pulse generator connected to said tube to cause said tube to be operative only during said gating pulse.

2. A synchronizing system for a signal generator comprising in combination means for producing an electrical oscillation recurring at a synchronous frequency and having a frequency of oscillation higher than said synchronous frequency, said electrical oscillation being sufficiently damped to be substantially completed before the start of the next oscillation, a tube, said tube having an input circuit, a frequency control output circuit and a gating circuit, said tube input circuit connected to receive said electrical oscillation, and a gating pulse generator arranged to receive timing energy from said signal generator, said gating pulse generator connected to said tube to cause said tube to be operative only during said gating pulse.

3. A synchronizing system for a signal generator comprising in combination a damped oscillatory circuit for producing an electrical oscillation recurring at a synchronous frequency and having a frequency of oscillation higher than said synchronous frequency, a tube, said tube having an input circuit, a frequency control output circuit and a gating circuit, a connection between said tube input circuit and said damped oscillatory circuit, and a gating pulse generator controlled in its timing by said signal generator, said gating pulse generator connected to said tube to cause said tube to be operative only during said gating pulse.

4. A signal generator synchronizing system comprising in combination a highly damped oscillatory circuit for producing an electrical oscillation recurring at a synchronous frequency and having a frequency of oscillation higher than said synchronous frequency, said electrical oscillation being sufficiently damped to be substantially completed upon the completion of a full cycle of oscillation, a tube, said tube having an input circuit, a frequency control output circuit, and a gating circuit, a connection between said tube input circuit and said damped oscillatory circuit, and a gating pulse generator controlled in its timing by said signal generator, said gating pulse generator connected to said tube to cause said tube to be operative only during said gating pulse.

5. A signal generator synchronizing system comprising in combination an oscillatory circuit for producing an electrical oscillation recurring at a synchronous frequency and having a frequency of oscillation higher than said synchronous frequency, said electrical oscillation being sufficiently damped to be substantially completed in a single cycle, a tube, said tube having an input circuit, a frequency control output circuit and an operation control circuit, a connection between said tube input circuit and said damped oscillatory circuit, a gating pulse generator controlled in its timing by said signal generator, and a connection between said gating pulse generator and said tube operation control circuit.

6. A signal generator synchronizing system comprising in combination an oscillatory circuit for producing an electrical oscillation recurring at a synchronous frequency and having a frequency of oscillation higher than said synchronous frequency, said electrical oscillation being sufficiently damped to be substantially completed before the start of the next synchronously initiated oscillation, a tube, said tube having an input circuit, a frequency control output circuit and a gating circuit, a connection between said tube input circuit and said damped oscillatory circuit, a second oscillatory circuit for producing a second series of electrical oscillation recurring at the frequency of said signal generator and having a frequency of oscillation higher than the frequency of recurrence of said second series of oscillations, said second series of oscillation being sufficiently damped to be substantially completed upon the completion of a full cycle of oscillation, and a diode, said second oscillatory circuit connected to said tube gating circuit through said diode to control the operation of said tube.

7. A signal generator synchronizing system comprising in combination a first oscillatory circuit for producing a first series of electrical oscillation recurring at a first designated frequency and having a frequency of oscillation higher than said first designated frequency, said electrical oscillation being sufficiently damped to be substantially completed before the start of the next oscillation, a tube, said tube having an input circuit, a frequency control output circuit and an operation control circuit, a connection between said tube input circuit and said first oscillatory circuit, a second oscillatory circuit for producing a second electrical oscillation recurring at a second designated frequency and having a frequency of oscillation higher than said second designated frequency, the oscillation of said second designated frequency being sufficiently damped to be substantially completed upon the completion of a full cycle of oscillation, a diode, and a connection between said tube operation control circuit and said second oscillatory circuit through said diode.

8. A signal generator synchronizing system comprising in combination an oscillatory circuit for producing an electrical oscillation recurring at a first designated frequency and having a frequency of oscillation higher than said first designated frequency, said electrical oscillation being sufficiently damped to be substantially completed before the start of the next oscillation, a tube, said tube having an input circuit, a frequency control output circuit and an operation control circuit, a connection between said tube input circuit and said damped oscillatory circuit, another oscillatory circuit for producing another electrical oscillation recurring at a second designated frequency and having a frequency of oscillation higher than said second designated frequency, said oscillation of said second designated frequency being sufficiently damped to be substantially completed upon the completion of a full cycle of oscillation, a diode, a connection between said tube operation control circuit and said last mentioned oscillatory circuit through said diode, a source of synchronizing signals and means connected to said source of synchronizing signals for synchronizing one of said designated frequencies.

9. A synchronizing system comprising in combination a signal generator, an oscillatory circuit for producing an electrical oscillation recurring at a first designated frequency and having a frequency of oscillation higher than said first designated frequency, said electrical oscillation being sufficiently damped to be substantially completed before the start of the next oscillation, a tube, said tube having an input circuit, a frequency control output circuit and an operation control circuit, a connection between said tube input circuit and said damped oscillatory circuit, a second oscillatory circuit for producing a second electrical oscillation recurring at a second designated frequency and having a frequency of oscillation higher than said second designated frequency, said oscillation of said second designated frequency being sufficiently damped to be substantially completed before the start of the next group of oscillations, a diode, a connection between said tube operation control circuit and said second oscillatory circuit through said diode, means for deriving synchronizing signals, means connected to said synchronizing signal deriving means for synchronizing one of said designated frequencies, a signal generator tuned to the other of said designated frequencies, and a connection between said tube frequency control output circuit and said signal generator.

10. A synchronizing method comprising the steps of producing an electrical oscillation recurring at a synchronous frequency and having a frequency of oscillation higher than said synchronous frequency, damping said electrical oscillation in order that the oscillation will be substantially completely damped before the start of the next oscillation, generating a gating pulse from a signal having a frequency to be controlled, and deriving a frequency control voltage by utilizing voltage from said electrical oscillation only during the time of said gating pulse.

11. An electrical synchronizing method comprising the steps of producing an electrical oscillation recurring at a synchronous frequency and having a frequency of oscillation higher than said synchronous frequency, damping said electrical oscillation in order that it will be substantially non-existent after the completion of a single complete cycle, producing a signal whose frequency is substantially equal to said synchronous frequency, producing an auxiliary electrical oscillation recurring at the frequency of said signal and having a frequency of oscillation higher than the frequency of recurrence of said signal frequency, said auxiliary oscillation being sufficiently damped to be substantially non-existent after the completion of a full cycle of oscillation, and controlling the frequency of said signal by utilizing for frequency control the voltage of said first mentioned electrical oscillation only during a half cycle of said auxiliary electrical oscillation.

12. An electrical synchronizing method comprising the steps of separately producing a pair of electrical oscillations recurring at substantially the same frequency and having a frequency of oscillation higher than their rate of recurrence, damping said electrical oscillations in order that they will be substantially non-existent after the completion of a full cycle of oscillation, synchronizing the recurrence of one of said separate electrical oscillations, half-wave rectifying one of said separate electrical oscillations, and combining said half-wave rectified electrical oscillations with the other of said separate electrical oscillations to produce a frequency control voltage to synchronize the recurring frequencies of both of said separate electrical oscillations.

13. An electrical synchronizing method comprising the steps of separately and concurrently producing a first and second series of electrical oscillations recurring at substantially the same frequency and having a frequency of oscillation higher than their rate of recurrence, damping said electrical oscillations in order that they will be substantially non-existent after the completion of a full cycle of oscillation, synchronizing the recurrence of one of said series of electrical oscillations, half-wave rectifying one of said series of electrical oscillations, and combining said half-wave rectified series of electrical oscillations with the other of said series of electrical oscillations to produce a frequency control voltage to synchronize the recurring frequencies of both of the series of said electrical oscillations.

WILLIAM D. HOUGHTON.

No references cited.